United States Patent
Drussel et al.

(10) Patent No.: US 6,814,208 B2
(45) Date of Patent: Nov. 9, 2004

(54) MULTI-ROW CAM-ACTUATED CENTRIFUGAL CLUTCH

(75) Inventors: Douglas W. Drussel, Sedalia, CO (US); George Michael Wilfley, Englewood, CO (US)

(73) Assignee: Drussel Wilfley Design, L.L.C., Denver, CO (US)

( * ) Notice: Subject to any disclaimer, the term of this patent is extended or adjusted under 35 U.S.C. 154(b) by 0 days.

(21) Appl. No.: 10/327,160

(22) Filed: Dec. 20, 2002

(65) Prior Publication Data

US 2003/0085096 A1 May 8, 2003

Related U.S. Application Data

(63) Continuation-in-part of application No. 09/877,518, filed on Jun. 7, 2001.

(51) Int. Cl.$^7$ ............................................. F16D 43/08
(52) U.S. Cl. ............................... 192/105 B; 192/70.23; 192/89.1; 192/93 C
(58) Field of Search ........................ 192/103 R, 105 R, 192/105 B, 93 R, 89.1, 70.23, 93 C

(56) References Cited

U.S. PATENT DOCUMENTS

| | | |
|---|---|---|
| 1,743,170 A | 1/1930 | Vail |
| 2,412,331 A | 12/1946 | Green |
| 2,555,860 A | 6/1951 | Reed |
| 2,717,674 A | 9/1955 | Crichton, Jr. |
| 2,721,639 A | 10/1955 | Miller |
| 2,931,476 A | 4/1960 | Zeidler et al. |
| 3,001,623 A | 9/1961 | Fawick |
| 3,003,608 A | 10/1961 | Biraben |
| 3,215,234 A | 11/1965 | Hirano |
| 3,265,172 A | 8/1966 | Atsumi et al. |
| 3,762,519 A | 10/1973 | Bentley |
| 3,842,954 A | 10/1974 | Honemann |
| 3,939,734 A | 2/1976 | Blanchette et al. |
| 4,457,185 A | 7/1984 | Yoshida et al. |
| 4,518,070 A | 5/1985 | Ooka |
| 4,550,817 A * | 11/1985 | Euler ...................... 192/70.23 |
| 4,576,269 A | 3/1986 | Hamane et al. |
| 4,592,458 A | 6/1986 | Matsuki et al. |
| 4,645,049 A * | 2/1987 | Matsuda et al. ............... 192/35 |
| 4,690,258 A | 9/1987 | Teraoka et al. |
| 4,732,252 A | 3/1988 | Kittel |
| 4,986,403 A | 1/1991 | Tipton |
| 5,033,598 A | 7/1991 | Tipton |
| 5,070,984 A * | 12/1991 | Fehring .................. 192/105 B |
| 5,361,882 A | 11/1994 | Tipton |
| 5,423,406 A | 6/1995 | Antonov |
| 5,441,137 A | 8/1995 | Organek et al. |
| 5,496,154 A * | 3/1996 | Hall et al. .................. 417/223 |
| 5,638,935 A * | 6/1997 | Fehring .................. 192/105 B |
| 5,669,480 A | 9/1997 | Kooy et al. |
| 5,733,217 A | 3/1998 | Naraki et al. |
| 6,315,096 B1 | 11/2001 | Dairokuno et al. |
| 6,533,056 B1 * | 3/2003 | Maimone ................ 192/105 B |
| 6,705,446 B2 * | 3/2004 | Drussel et al. ................ 192/83 |

* cited by examiner

*Primary Examiner*—Saul Rodriguez
(74) *Attorney, Agent, or Firm*—John E. Reilly

(57) ABSTRACT

A centrifugal clutch for motorcycles employs a cam-actuating mechanism having multiple rows of centrifugal force-responsive cam members of a selected density and size to force a series of clutch plates into clutching engagement over the shortest possible distance and least possible speed of rotation while assuring ease of positive engagement of the clutch members in response slight increases in speed of rotation. The cam-actuating mechanism can be employed with a manual override mechanism to manually control locking and release of the clutch members as well as utilizing a torque limiter to absorb shock loads without unduly increasing the size of the clutch so that it will readily fit into the space occupied by existing or standard clutch mechanisms.

17 Claims, 8 Drawing Sheets

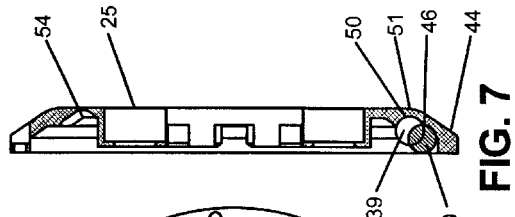
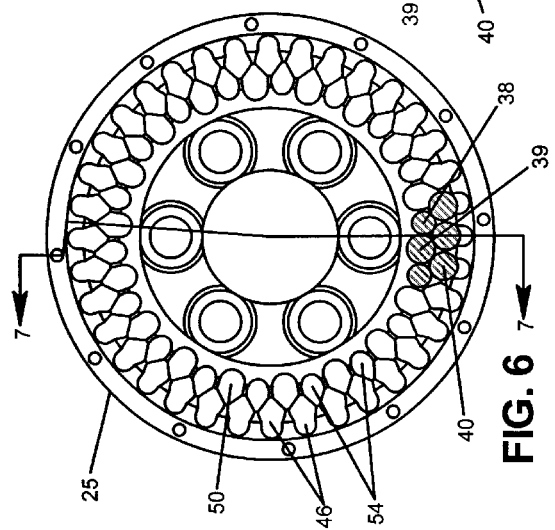
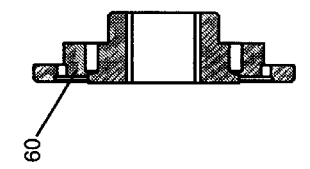
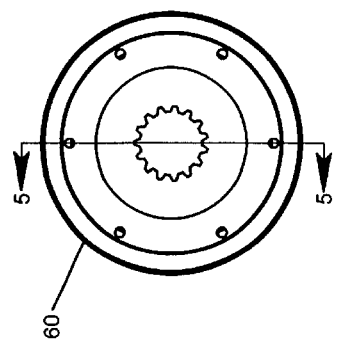
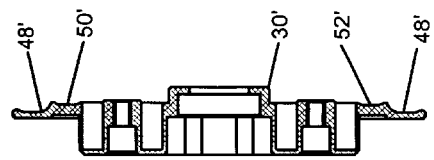
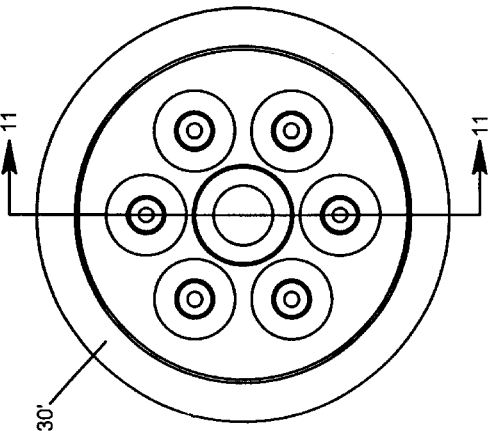
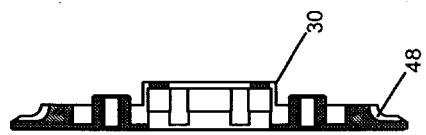
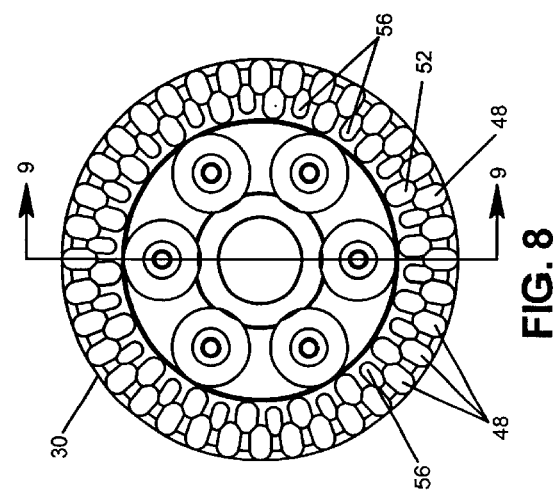

MULTI-ROW CAM-ACTUATED CENTRIFUGAL CLUTCH

CROSS-REFERENCE TO RELATED APPLICATIONS

This application is a continuation-in-part of patent application Ser. No. 09/877,518, filed Jun. 7, 2001 for AUTOMATIC CLUTCH WITH MANUAL OVERRIDE CONTROL MECHANISM by Douglas W. Drussel and George Michael Wilfley and assigned to the assignee of this invention and incorporated by reference herein.

BACKGROUND AND FIELD OF INVENTION

This invention relates to centrifugal clutches and more particularly relates to novel and improved centrifugal clutches having high density cam members which are urged outwardly under centrifugal force in order to activate the clutching elements.

Centrifugal clutches have been developed for motorcycles utilizing one or two rows of balls or other cam members which would move outwardly in response to rotation of a drive shaft to cause the clutch plates to move into engagement with one another. However, in certain applications it was found that there is insufficient centrifugal force generated to clamp the clutch plates together without substantial slipping or without utilizing a larger size case or cover which exceeds the space allowances within stock engine cases. For example, space is at a particular premium in motorcycle clutches incorporating a manual override mechanism, such as, that set forth and described in copending application for U.S. patent Ser. No. 09/877,518 for AUTOMATIC CLUTCH WITH MANUAL OVERRIDE CONTROL MECHANISM.

Accordingly, there is a need for a cam mechanism for centrifugal clutches which can generate the necessary force to clamp the clutch plates together without substantial slipping or increasing the size of the clutch case or cover. At the same time it is desirable to provide a cam-actuating mechanism which requires a minimum of manual pressure to engage or disengage the clutch elements with a manual override mechanism while at the same time being highly sensitive to acceleration in speed to effect engagement of the clutch elements. Still further, a controlled amount of slippage may be built into the hub drive for the clutch in order to prevent damage to the drive train resulting from the application of shock loads. In addition, it may be desirable in certain applications to utilize a cover which can be secured along its outer peripheral edge to the clutch basket and to employ needle bearings between the inner hub and rear wall of the basket in order to minimize drag.

SUMMARY OF THE INVENTION

It is therefore an object of the present invention to provide for a novel and improved cam-actuating mechanism for an automatic clutch.

Another object of the present invention is to provide for a cam-actuating mechanism for centrifugal clutches which is capable of achieving clutch engagement at lower rpms while generating the necessary clamping force and avoiding slipping of the clutch plates in a simplified, efficient manner.

It is a further object of the present invention to provide in a centrifugal clutch, including those having internal manual override mechanisms, for an extremely compact cam mechanism which is capable of generating sufficient centrifugal force to clamp the clutch plates together without substantial slipping and within the same size case or cover as employed in stock or standard motorcycles.

It is a still further object of the present invention to provide an automatic clutch in which a series of high density balls are so constructed and arranged as to minimize wear and enable ease of positive engagement of the clutch members either in response to speed of rotation or manual pressure exerted through a manual override mechanism.

An additional object of the present invention is to provide in an automatic clutch for controlled slippage to prevent shock loads from being imparted through the drive train of a motorcycle.

In accordance with the present invention, a centrifugal clutch has a plurality of cam members interposed between a cover and pressure plate wherein the cam members are movable outwardly under centrifugal force to cause the pressure plate to move in a direction forcing the clutch members into clutching engagement, and cam retainer means between the pressure plate and cover for retaining the cam members in a plurality of concentric rows whereby to guide radial movement of the cam members and wherein one of the rows is staggered with respect to the other of the rows. In one form of invention, the cam members in one of the inner concentric rows are smaller than the cam members in other of the concentric rows and the retainer means are defined by a plurality of indented cam faces which define the concentric rows in the cover and wherein each of the cam faces includes a ramp inclining radially outwardly in a direction toward the pressure plate. The pressure plate may be correspondingly formed with cam faces aligned with the cam faces in the cover to define complementary pairs of cam faces, each of which receives one of the cam members therebetween. The space required to house the cam members is reduced by employing high density balls as the cam members which are composed of a material, such as, tungsten carbide and when arranged in multiple rows as described are sensitive to slight increases in speed of rotation of the clutch to force the clutch members into clutching engagement; and similarly a minimum of manual pressure is required of a manual override mechanism to force the cam members into and out of clutching engagement. In this relation, the compact cam-actuating mechanism enables utilization of a manual override mechanism internally of the clutch without increasing the overall size of the clutch and enable the clutch to be substituted for existing standard or stock motorcycle clutches.

Among other features of the present invention is to employ frictional control means between the clutch housing and hub to prevent shock loads from being transferred to the drive train or transmission when the clutch members remain in non-slipping engagement with one another. Another feature is to provide for circumferentially spaced bearings between the end wall of the clutch housing and inner hub when a thrust washer is mounted between the gear and inner hub to prevent galling or seizing up of the thrust washer particularly in the absence of lubrication between the thrust washer housing.

There has been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying but the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 4 is a front view of the inner hub of the clutch shown in FIGS. 2 and 3;

FIG. 5 is a cross-sectional view taken about lines 5—5 of FIG. 4 of the inner hub of the preferred form of clutch shown in FIGS. 2 and 3;

FIG. 6 is a front view in elevation of the cover of the form of clutch shown in FIGS. 2 and 3 and illustrating the staggered relation of a select number of cam members in cam faces on the inner surface of the cover;

FIG. 7 is a cross-sectional view taken about lines 7—7 of FIG. 6;

FIG. 8 is a front view in elevation of the internal cam faces on the pressure plate of the preferred form;

FIG. 9 is a sectional view taken about lines 9—9 of FIG. 8;

FIG. 10 is a front view in elevation of a modified form of pressure plate without indented cam faces;

FIG. 11 is a sectional view taken about lines 11—11 of FIG. 10;

DETAILED DESCRIPTION OF ONE FORM OF INVENTION

Figure 1:
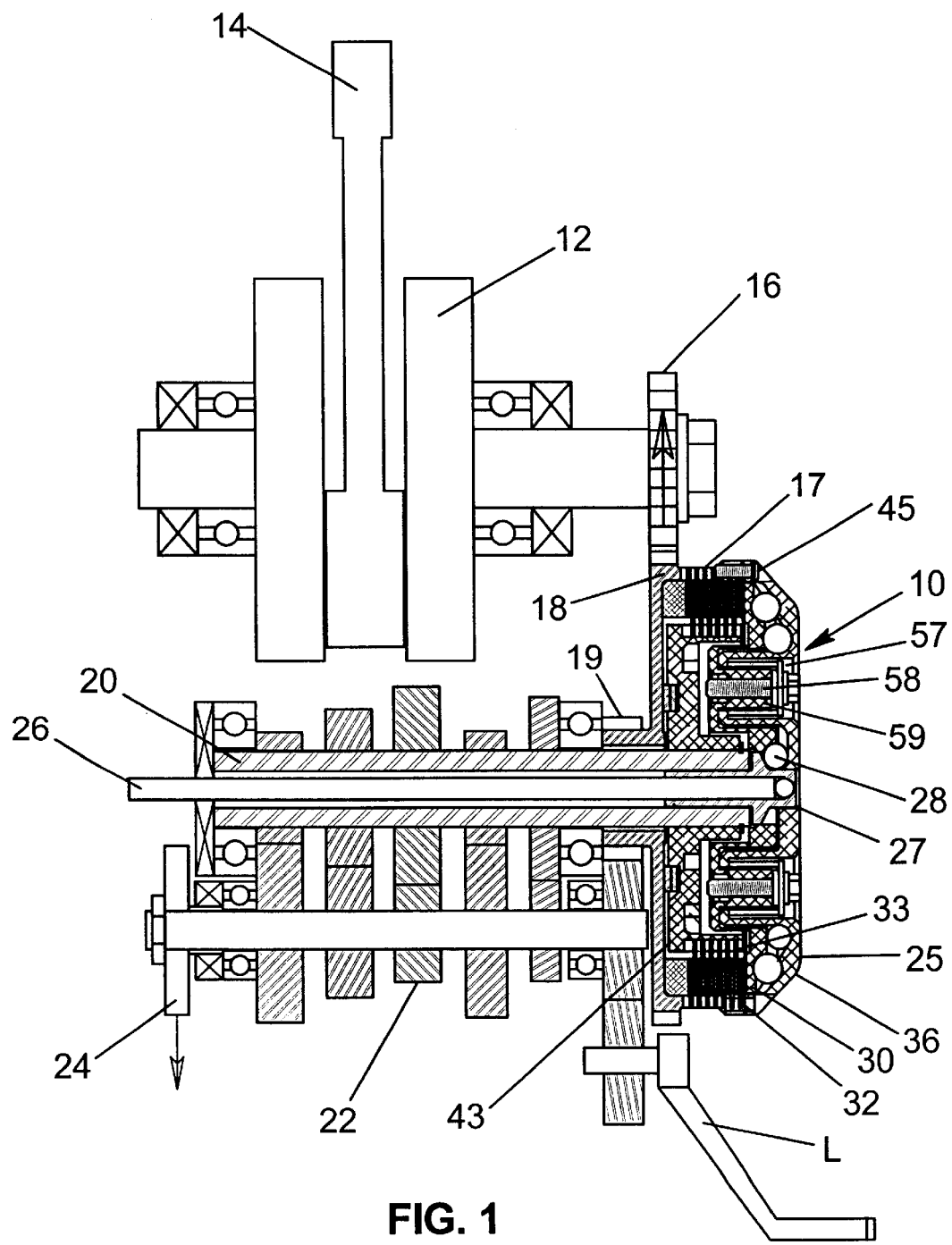
FIG. 1 is a view partially in section of an automatic clutch for a motorcycle having a manual override and incorporating multiple rows of cam members in accordance with the present invention.

Referring to the drawings, FIG. 1 schematically illustrates the mounting of one form of automatic clutch 10 in the drive train of an off-road motorcycle wherein a crankshaft set 12 from an engine piston 14 imparts rotation to a power input side of the clutch 10 through a pinion 16 into a primary drive gear 18 at one end of a clutch housing or basket 17. A transmission shaft 20 is mounted for rotation by the clutch 10 when in the engaged position and, through speed reduction gears represented at 22 rotates a drive sprocket 24 of a belt or chain drive, not shown, into the rear wheel of the motorcycle. In a manner shown and described in more detail in copending application for patent Ser. No. 09/877,518, a push rod 26 extends through the transmission shaft 20 and is manually controlled by a hand lever, not shown, on the motorcycle to advance a slide member 27 forwardly and force a series of balls 28 in a radial outward direction against a pressure plate 30. Outward radial movement of the balls 28 against the pressure plate 30 will displace the pressure plate 30 away from the cover 25 and force a series of radially inner clutch plates 32 to move into positive engagement with radially outer clutch plates 34. Again, although not shown, a linkage at the end of the push rod opposite to the cover 25 is connected to a cable control wire which can be manually controlled by a hand lever on the handlebar of the motorcycle to advance and retract the push rod 26 with respect to the clutch assembly 10. Thus, the motorcycle can be bump-started by engaging the transmission gears, rolling the motorcycle along the ground to reverse the transmission from the rear wheel into the transmission shaft 20 and activating the push rod 26 as described to displace the clutch members 32 and 34 into positive locking engagement.

Again, bumpstarting the motorcycle by activation of the manual override mechanism consisting of the push rod 26, slide 27 and cam rollers 28 serves as an alternative to starting of the motorcycle in emergency situations when the automatic clutch is disengaged or at lower rpms or when the engine is idling. In accordance with the present invention, the automatic clutch 10 also incorporates a novel cam-actuating mechanism generally designated at 36 and comprising multiple staggered rows of cam members 38, 39 and 40, to be hereinafter described in reference to FIGS. 4 to 11, which will move outwardly under centrifugal force between the cover 25 and pressure plate 30 to force the clutch plates 34 into positive engagement with the plates 32. The inner clutch plates 32 have tabs 33 which are axially slidable in grooves in the outer wall of hub 43, and the transmission shaft 20 is mounted for rotation of the hub 43. The radially outer clutch plates 34 have extension tabs 35 which are slidable axially along circumferentially spaced axial grooves on the inner wall of a cylindrical basket or housing 17. A basket 17 is secured along its outer peripheral edge to the outer peripheral edge of the cover 25 by suitable fasteners, such as, screws 45. The clutch plates 32 and 34 are sandwiched between the pressure plate 30 and the gear 18 at the end of the basket 17, and the pressure plate 30 is normally held away from the clutch plates 32, 34 by a series of compression springs 59 mounted on bolts 54 between the cover 25 and recessed portions 57 in the pressure plate 30. The spring tension of the springs 59 is regulated to resist radial outward movement of the balls 38, 39 and 40 as well as movement of the pressure plate 30 against the plates 32, 34 until the clutch 10 reaches a predetermined rotational speed imparted by the crankshaft 12 through the gear 18, for example, when the engine has been started by the kickstart lever L. The construction and arrangement of the clutch plates 32 and 34 as well as the kickstart lever L is standard.

DETAILED DESCRIPTION OF PREFERRED FORM OF INVENTION

FIGS. 2 to 11 illustrate a preferred form of clutch 10' in which like parts to those of FIG. 1 are correspondingly enumerated. More specifically, in FIGS. 2 and 3, the manual override mechanism in FIG. 1 consisting of the push rod 26, slide 27 and cams 28 has been removed. Instead, the clutch is actuated only by the cam-actuating mechanism 36 which is broadly comprised of radially inner and outer rows of circumferentially spaced cam members or bails 38, 39 and 40 interposed between a pressure plate 30 and a cover 25. The balls 38 to 40 are responsive to centrifugal force to roll outwardly along radial pockets or cam faces 48, 52 and 56 in the pressure plate 30 and aligned pockets or cam faces 46, 50 and 54 in the cover 25 so as to axially displace the outer frictional clutch plates 32 into locking engagement with the inner clutch plates 34.

An important feature of the present invention resides in the radially inner and outer rows of cam members or balls 38, 39 and 40. Preferably, as shown in FIGS. 4 to 11, a series of circumferentially spaced cam faces 46 are arranged in a radially outer row of the cover 25 and are disposed in facing relation to a corresponding row of cam faces 48 on the pressure plate 30. The balls 40 are disposed between each of the confronting cam faces 46 and 48 and are disposed in uniformly spaced relation to one another.

An inner row of cam faces 50 is arranged on the cover 25 in inner concentric relation to the outer row between alternate adjacent pairs of cam faces 46 in the outer row. The cam faces 50 are disposed in aligned, facing relation to correspondingly spaced cam faces 52 on the pressure plate 30, and the balls 39 are disposed for radial sliding movement between the cam faces 50 and 52.

A third row of cam faces 54 extends between alternate cam faces 50 on the cover 25 and are disposed radially inwardly but partially between alternate adjacent pairs of the cam faces 46. The cam faces 54 are disposed in aligned facing relation to correspondingly sized cam faces 56 in the pressure plate 30 and are adapted to receive the ball members 38. The cam faces 54, 56 define a somewhat staggered concentric row with respect to the inner concentric row of cam faces 50, 52 by virtue of being somewhat smaller in size to receive the smaller balls 38. Accordingly, the cam faces 54, 56 are free to extend radially outwardly between the cam faces 46, 48 a slightly greater distance than the larger cam faces 50, 52.

Preferably, each of the outer cam faces 46 is formed along an angled surface 44 of approximately 30° to 50° adjacent to the outer periphery of the cover 25 and are of generally concave, oval-shaped configuration so as to be elongated in the radial direction. The cam faces 46 are dimensioned to be of a length to permit rolling movement of a ball between the radial inner and outer positions illustrated in FIG. 6 in response to centrifugal force. The same balls 40 are free to slide or roll in an outward radial direction along the outer concentric, confronting cam faces 48 in the pressure plate 30; however, the cam faces 48 are shallower than the cam faces 46 and flatten out from an inner radial curved configuration along the rolling surface portion of the face. The cam faces 48 each terminate in the flattened surface portions so as to be relatively open-ended as best seen from FIG. 9 at the outer peripheral edge of the cover 30. The inner row of cam faces 50 is situated at the base 51 of the angled portion 44 and each face 50 is of generally concave, oval-shaped configuration and elongated in the radial direction with the contact surfaces of the cam faces 50 angled at approximately 30°–50° toward the pressure plate 30. The balls 39 are free to undergo the same distance of radial sliding or rolling movement as the balls 40. In turn, the cam faces 52 on the pressure plate 30 are of generally concave configuration and elongated in the radial direction but not angled toward the confronting cam faces 50 and have flat surfaces along which the balls 39 are free to roll.

The intermediate or staggered cam faces 54 on the cover 25 are of a configuration corresponding to the inner row 50 but again are shorter only to accommodate the smaller balls 38. Similarly, the cam faces 56 in the pressure plate 30 correspond in configuration to the cam faces 52 but are shallower than the cam faces 52. Referring to the cam-actuating mechanism 36 employed in the preferred and alternate forms of invention of FIGS. 2 to 15, the staggered inner row of balls 38 maximizes the weight of the balls so that axial force generated is maximized at minimum speeds. This creates more axial force at lower speeds to engage the clutch positively at low engine speed. The outer row of balls 40 has the most influence because it is at the largest diameter so that it is fitted with the most balls possible. To get more weight an inner row is added. To maximize the diameter and therefore the centrifugal effect of the inner row, it is nested between the outer row of balls. This means that the inner row must have the same number of balls as the outer row. For the purpose of illustration but not limitation, if there are thirty-six balls 40 of ⅜' diameter in the outer row, the inner row can be made up of thirty-six smaller balls or a combination of small and large balls. It turns out that eighteen balls of ⅜' diameter and eighteen balls of 5/16' diameter will fit in the inner row and nest between the balls in the outer row and provide the maximum mass. The other options such as all 5/16' diameter balls in the inner row or limiting each row to thirty-two balls and use all ⅜' diameter balls all result in less total mass. The cam faces for the balls 38, 39 and 40 are designed to let the balls ride on a radially flat surface on the pressure plate and on a radially uniformly inclined surface on the cover. The pockets for the ⅜' balls and 5/16' balls are different depths so all the balls will be in contact with both the pressure plate and cover at all times.

The relative depths within each component is of no significance. Thus they are all designed to travel the same distance. The cam faces are actually slightly longer than necessary so the balls will never come to the outer ends, but will always be stopped by the axial resistance of the friction disks. The pockets are different lengths only because of the diameter of the cutter used to make them. The straight portion of each pocket (the range where the ball is intended to operate) is the same for all cam faces or pockets since the travel is expected to be the same. The cutter makes a radius beyond this usable length which is equal to the cutter radius so each pocket is the usable length plus twice the radius. Thus the pockets for ⅜' balls are 1/16' longer than the pockets for the 5/16' balls. The shape of the outer end of the pockets doesn't matter, as the balls never get there anyway. The inner end of each pocket is normally rounded so the ball will nest there when the clutch is disengaged, but it could be squared or other shapes to provide a method to simply keep the balls from falling out. In practice, the shapes of the ends of the pockets may vary because of the overall shape of the part and how they blend with other geometry.

Further, in certain applications, it may be desirable to employ a modified form of pressure plate 30' in place of the pressure plate 30, as illustrated in FIGS. 10 and 11. The pressure plate 30' has substantially flat surfaces 48', 50' and 52' along which the balls 38, 39 and 40, respectively, will advance. In this way, the complementary cam faces 46, 50 and 54 on the cover 25 serve as the sole means of spacing and guiding the ball members 38, 39 and 40 radially inwardly and outwardly between the cover 25 and pressure plate 30'. It will be readily apparent that other types of ball races may be employed in place of the pockets or cam faces 46, 50 and 54 in the pressure plate to maintain the desired spacing and alignment of the balls 38 to 40 between the confronting surfaces of the cover 25 and the pressure plate 30 or 30'.

Preferably, the cam members or balls 38 to 40 are composed of a material of high density, such as, tungsten carbide in cooperation with the cam rows as described. In this way, it is possible to make the entire cam-actuating mechanism more compact with smaller-sized balls of higher density being more sensitive to the speed of rotation or centrifugal force so as to displace the clutch plates into positive locking engagement at lower speeds. Use of high density cam members 38 to 40 therefore minimizes the speed necessary to cause the balls to advance the plates into locking engagement as well as to prevent, or at least minimize, any slippage between the clutch plates 32 and 34.

Figure 2:
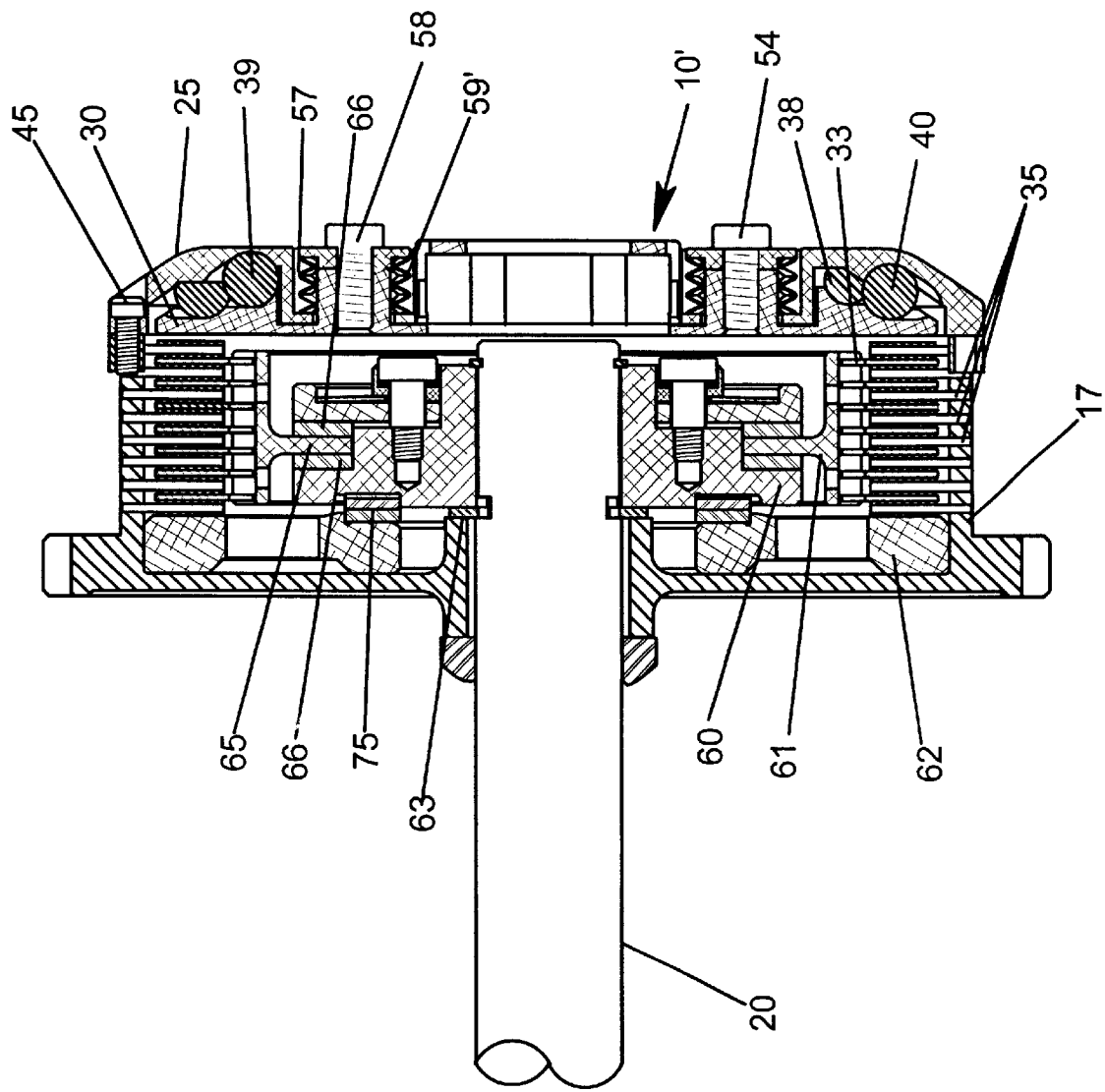
FIG. 2 is an enlarged view partially in section of preferred form of automatic clutch having a torque limiter assembly and multiple rows of cam members shown in the released position.
Figure 3:
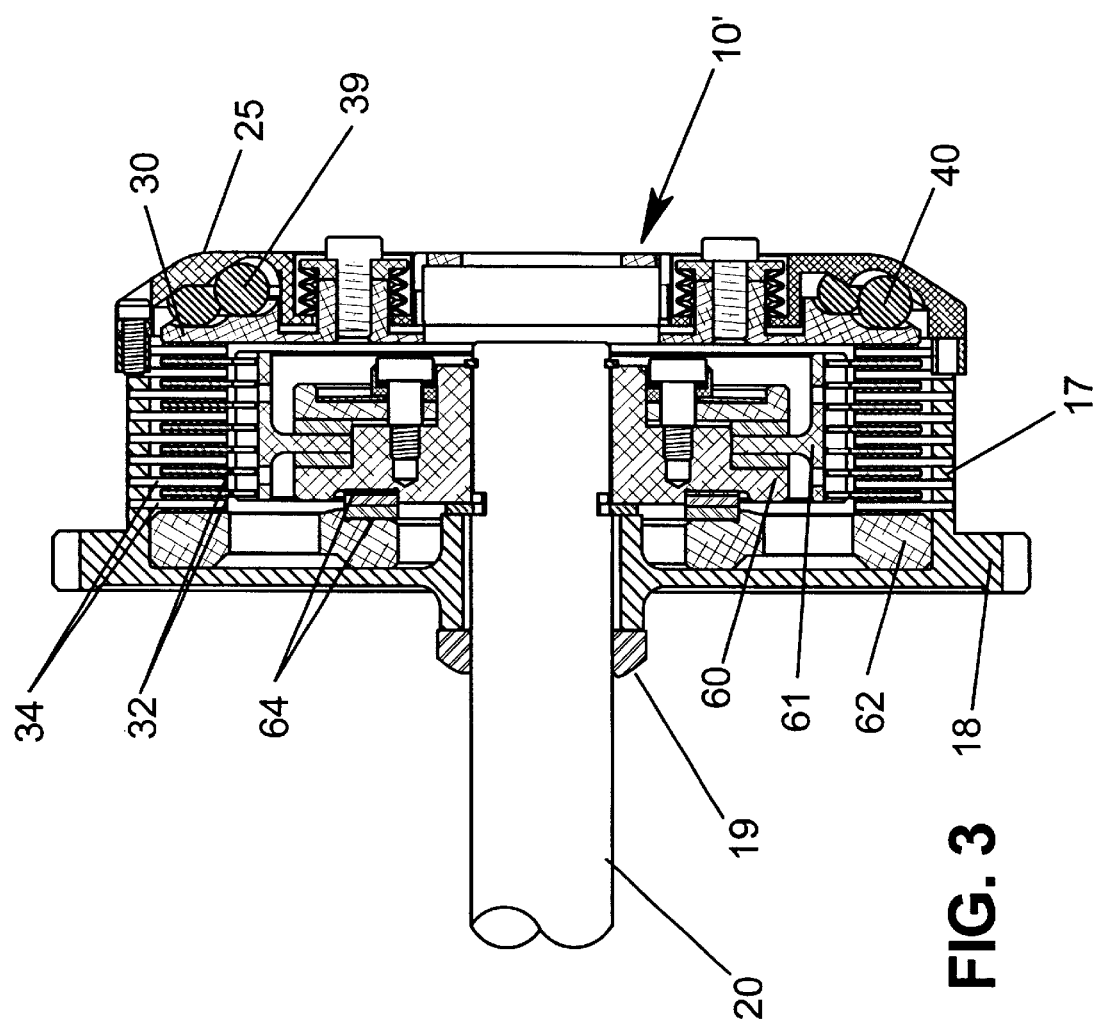
FIG. 3 is a view corresponding to FIG. 2 shown in the engaged position.
Figure 13:
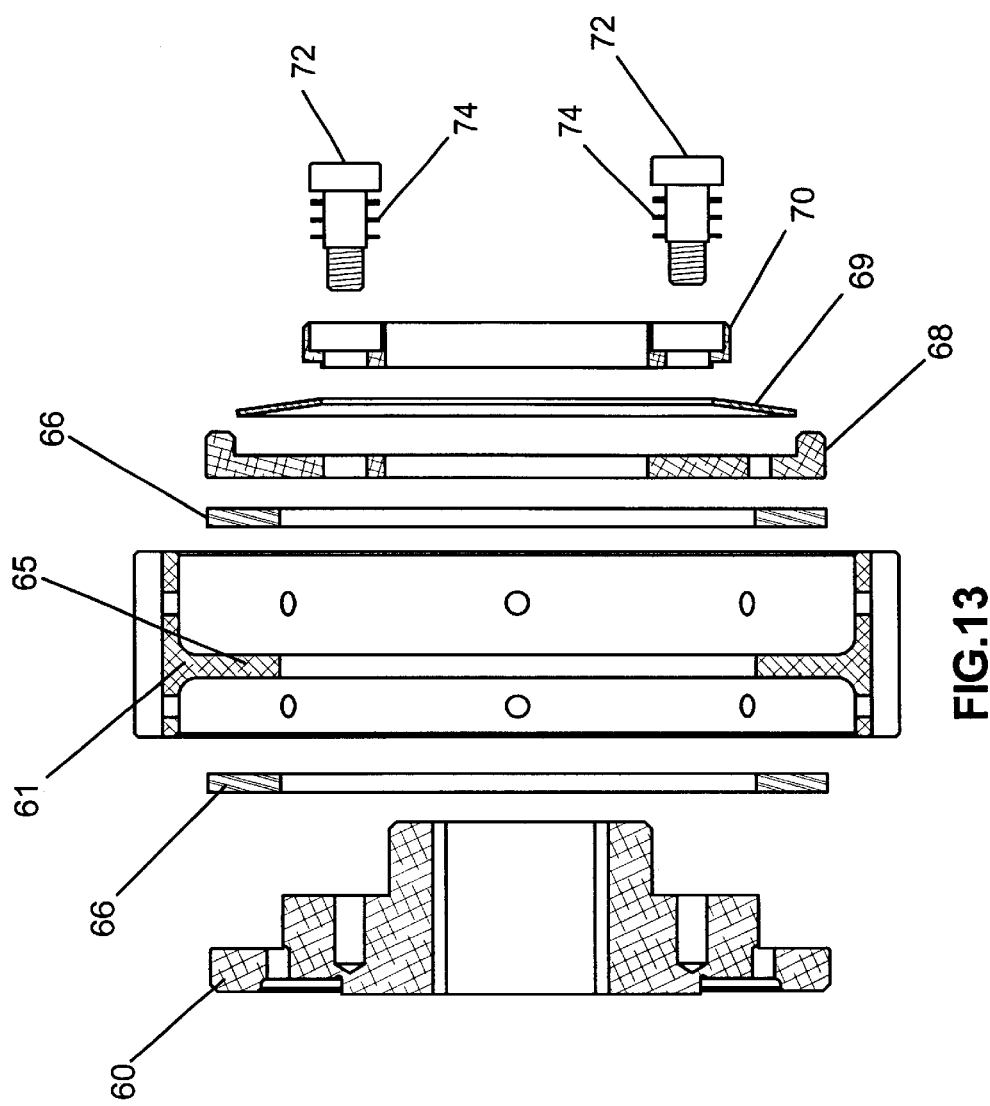
FIG. 13 is an exploded view with parts shown in section of the torque limiter assembly shown in FIG. 12.
Figure 12:
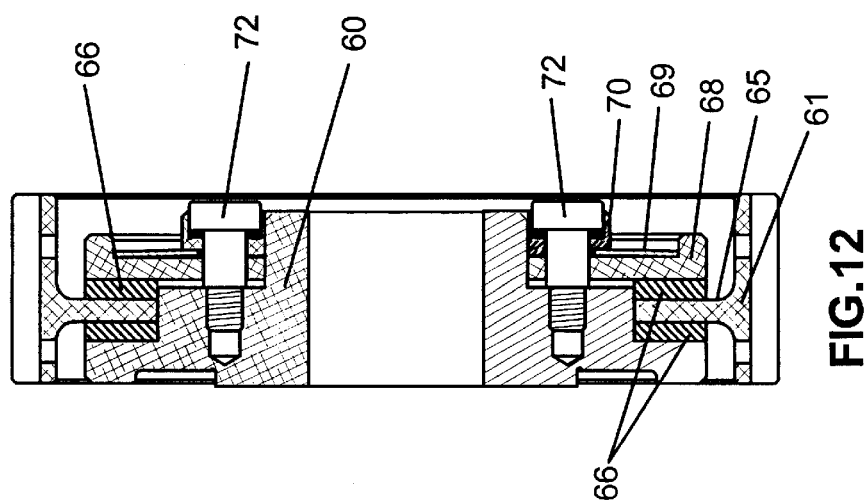
FIG. 12 is an enlarged view in section of the torque limiter assembly shown in FIGS. 2, 3, 10 and 11.

Referring in particular to FIGS. 2 and 3, the pressure plate 30 is normally retained against the cover 25 by a series of compression springs 59' mounted on bolts 58 between the cover 25 and recessed portions 57 in the pressure plate 30. Preferably, the springs 59' are WAVE™ springs Model No. CO75-M5 manufactured and sold by Smalley Steel Ring Co. of Lake Zurich, Ill. The springs 59' are pretensioned to resist outward radial movement of the balls 38 to 40 until the engine reaches a predetermined speed thereby causing the clutch plates 32 and 34 to move into locking engagement and impart rotation to the hub 60 and shaft 20.

In certain applications, such as, for example, trail bikes or racing bikes where a limited degree of slippage is needed to absorb shock loads resulting from sudden braking, one or more adjustments may be made including but not limited to reducing the number of balls 38 to 40 in each row, reducing the spring tension of the springs 59', or employing lower density ball members in one or more of the rows 38 to 40.

In accordance with the present invention, another highly effective way to prevent shock loads from being transmitted through the drive train when there is non-slip engagement between the clutch plates 32 to 34 is to employ a torque limiter mechanism T as illustrated in FIGS. 2, 3 and 12 to 15. Thus, in place of the inner hub drive shown in FIG. 1, split inner hub portion 60 and outer hub portion 61 as well as a spacer 62 are positioned in the basket 17; also a thrust washer 63 is mounted on the shaft 20 to separate the end wall of the basket 17 from the inner hub 60. A circular flange 65 on the outer hub portion 61 is sandwiched between a pair of annular friction disks 66 and a cover plate 68. A Belleville spring 69 and retainer 70 are assembled together with the inner hub 60 by a series of screws 72 having suitable shims 74 between the enlarged heads of the screws 72 and spring retainer 70, the Belleville spring 69 acting to pretension the shims 74 and thereby to compress the friction disks 66 into substantially non-slipping engagement with the flange 65.

When the pressure plate 30 is displaced by the balls 38 to 40 to lock the clutch plates 32 and 34 together, the outer hub 61 will operate through the friction disks 66 to drive the inner hub 60 and transmission shaft 20. The friction disks 66 will permit slight or instantaneous slippage so as to absorb any shock loading, for example, when the rear wheel of the motorcycle is off the ground and spinning, then suddenly hits the ground and is stopped while the engine continues to run. Thus, there is just enough slippage between the friction disks 66 and flange 65 to prevent shock loads from being imparted to the drive train via transmission shaft 20 as a result of the non-slip engagement between the clutch plates 32 and 34.

In addition, bearing races 64 are interposed between the spacer 62 and the inner hub 60 to receive a plurality of circumferentially spaced needle bearings 75 to prevent the thrust washer 63 from galling or seizing up under certain conditions of use if there is insufficient lubrication between the thrust washer 63 and spacer 62 when the inner hub 60 is driven by the hub drive 61. The needle bearings 75 also reduce the friction between the spacer 62 and the inner hub 60 when the clutch is not engaged; and reduces any tendency of the clutch to creep when it is not engaged.

DETAILED DESCRIPTION OF MODIFIED FORM OF INVENTION

Figure 14:
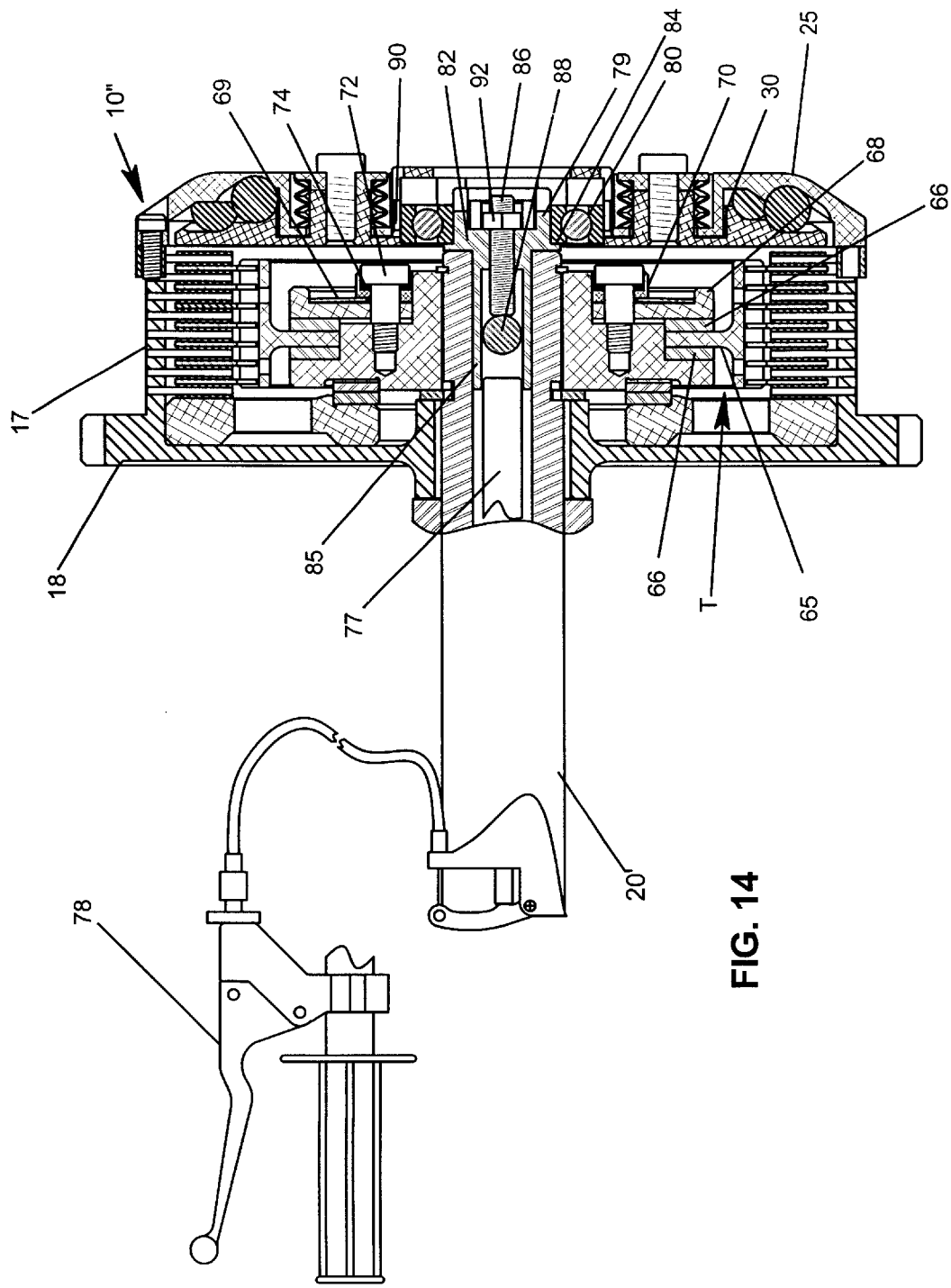
FIG. 14 is a view partially in section of another modified form of automatic clutch incorporating a torque limiter assembly and clutch lockout mechanism shown in the released position in accordance with the present invention.
Figure 15:
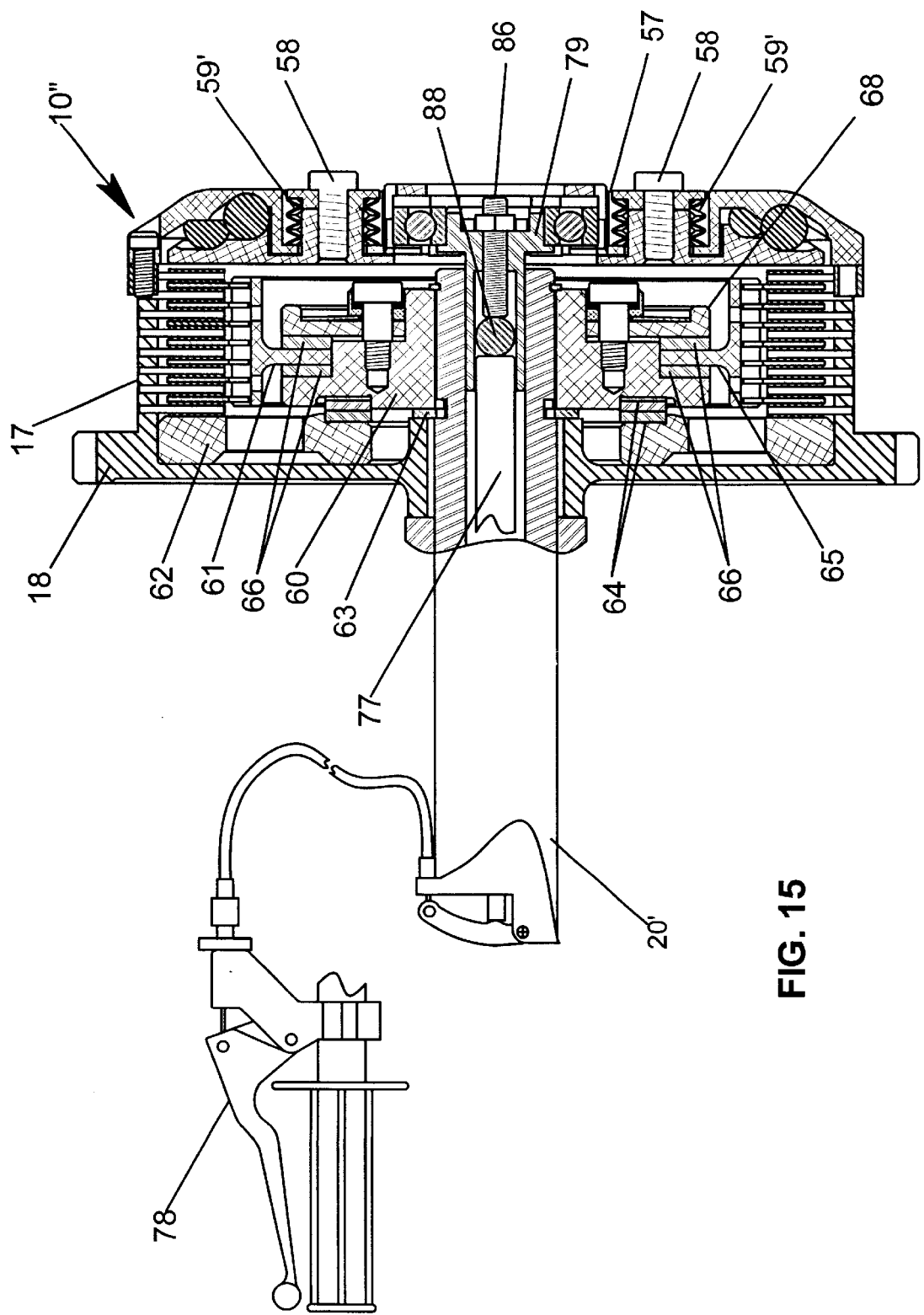
FIG. 15 is a view partially in section of the form of invention of FIG. 14 with lockout mechanism shown in the engaged position.
Figure 16:
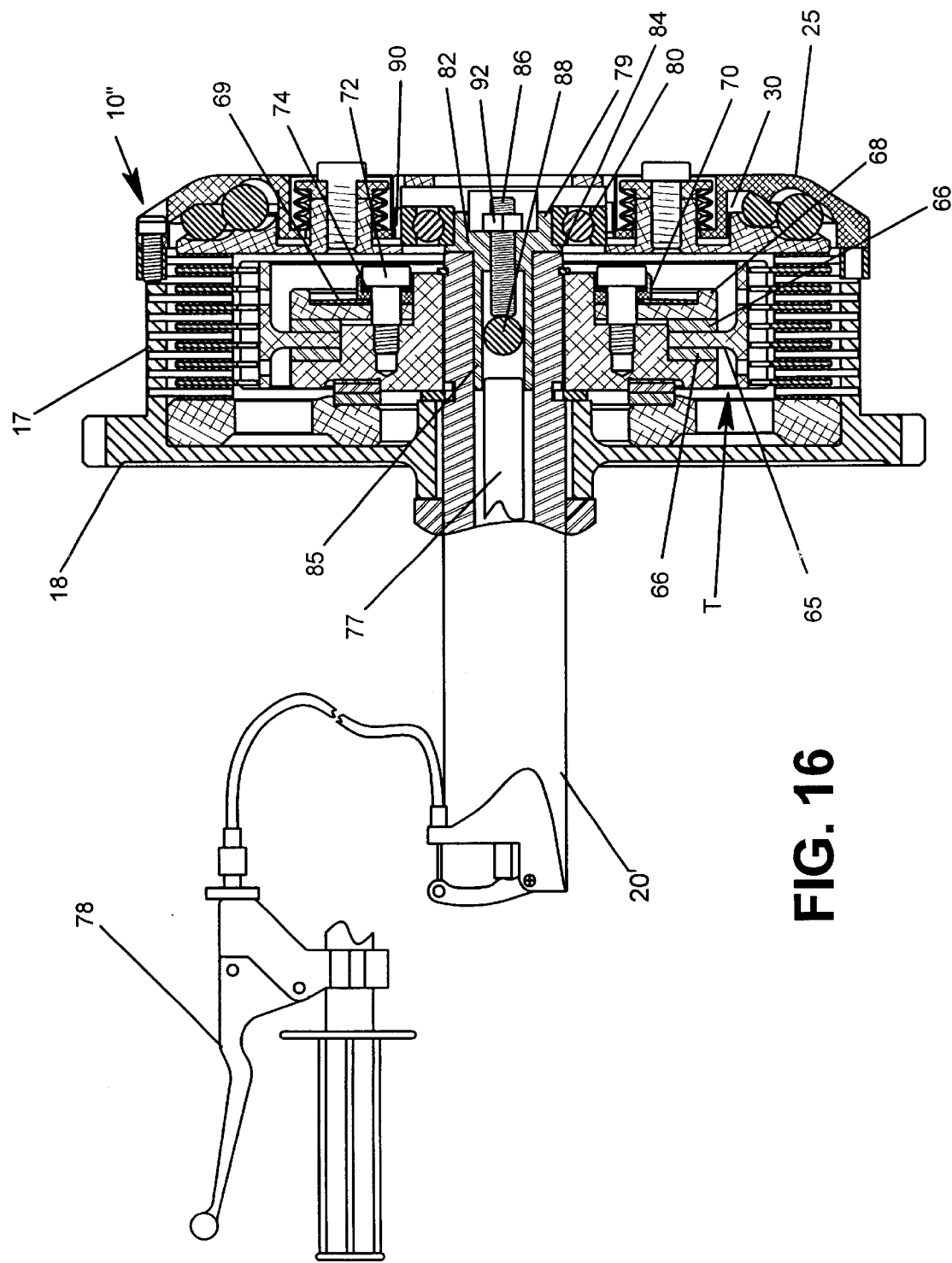
FIG. 16 is another view partially in section of the form of invention shown in FIGS. 14 and 15 with the automatic clutch in the engaged position.

FIGS. 14 to 16 illustrate a motorcycle clutch 10" having a manual override mechanism including a control rod 77 with hand control lever 78, receiver or guide 79 and ball bearing 80. Like parts to those of the preferred form of FIGS. 2 to 11 are correspondingly enumerated. Specifically, this form of invention is an improvement to the modified form of FIGS. 12 and 13 in my copending application for patent Ser. No. 09/877,518. The pressure plate 30 and cover 25 are designed to enable the manual override mechanism to mechanically lock the clutch in a released or neutral position, as shown in FIG. 15, so that the clutch 10" cannot be engaged until the control rod 77 is released by releasing the lever 78 to the position shown in FIG. 14. To this end, the receiver 79 includes a sleeve 85 inserted in the leading end of the transmission shaft 20 and an opposed generally cup-shaped end 82. An external shoulder 84 on the end 82 engages a flat end of the bearing race for the ball bearing 80, the bearing 80 being permanently affixed to an inner peripheral edge 90 of the pressure plate 30.

A threaded stem 86 is adjustably mounted in a threaded bore centrally of the receiver 79 and has a ball bearing 88 at one end of the stem 86 within the sleeve 85. The stem is threadedly adjustable and locked in place by a lock nut 92, according to the length of the control rod 77, so that the receiver 79 will be advanced between the released position shown in FIG. 14 and lockout position shown in FIG. 15. Accordingly, only when the control lever 78 is released, as shown in FIG. 14, will the pressure plate 30 be able to compress the clutch plates 32, 34 under the urging of the ball members 38 to 40 in response to the engine accelerating to a speed sufficient to overcome the force of the springs 59', as shown in FIG. 16. In this way, the automatic clutch 10" can be employed on a motorcycle having an electric starter in place of a stock or manual clutch typically used in such situations. In the same manner as in the form of invention of FIGS. 2 to 11, the modified form of FIGS. 14 to 16 employs the same cam-actuating mechanism 36 so as to be extremely compact with smaller cam members or balls 38, 39 and 40 being highly sensitive to acceleration in speeds and thus the speed necessary to cause the clutch plates 32 and 34 to engage. In addition, minimum manual or hand pressure is required on the hand lever 78 to retain the clutch plates 32 and 34 in the released position.

The foregoing description of the modified form of clutch 10" shown in FIGS. 14 to 16 is given more by way of illustrating the versatility of the preferred and modified forms of automatic clutches with or without the manual override mechanisms 36 of the type disclosed herein as well as in my hereinbefore referred to copending application for patent Ser. No. 09/877,518. In general, however, the manual override mechanism 36 is useful in any application where it is desirable to manually release or engage the clutch members 32 and 34 in addition to the automatic clutch, and the pressure required to engage the clutch members can be adjusted by a combination of changes in spring tension of the springs 59' as well as the number and weight of cam members 38 to 40. Thus, the cam-actuating mechanism for the reasons described requires a minimum of manual pressure to engage or disengage the clutch elements with a manual override mechanism as well as being highly sensitive to acceleration in speed to cause the clutch members to engage.

Although the preferred and modified forms of invention herein have been described for use in motorcycles, it will be appreciated that they are adaptable for use in other applications in which an automatic clutch is utilized, such as for example, drag racing, cars, trucks, tractors, go-carts, all-terrain vehicles, cement mixers and power tools that, depending upon the application, the different features of the preferred and modified forms of invention herein described may be utilized with a single row cam-actuating mechanism.

It is therefore to be understood that while preferred and modified forms of invention are herein set forth and described, the above and other modifications and changes may be made in the construction and arrangement of elements as well as intended use of the apparatus without departing from the spirit and scope thereof as defined by the appended claims and equivalents thereof.

We claim:

1. In a centrifugal clutch having a rotary driven member, a driven unit coupled to said driven member, a rotatable drive member in outer spaced concentric relation to said driven member, clutch members mounted for relative axial displacement into and out of engagement with one another between said driven unit and said drive member, and a pressure plate axially displaceable between a cover and an endmost of said clutch members, the improvement comprising:

a plurality of cam members interposed between said cover and said pressure plate wherein said cam members are movable radially outwardly under centrifugal force to cause said pressure plate to move in a direction causing said clutch members to move into clutching engagement with one another; and cam retainer means between said pressure plate and said cover for retaining said cam members in a plurality of concentric rows whereby to guide radial movement of said cam members, and wherein one of said rows is staggered with respect to the other of said rows.

2. In a centrifugal clutch according to claim 1 wherein said cam members in one of said inner concentric rows are smaller than said cam members in another of said concentric rows.

3. In a centrifugal clutch according to claim 1 wherein biasing means urges said pressure plate in an axial direction away from said clutch members.

4. In a centrifugal clutch according to claim 2 wherein said retainer means are defined by a plurality of indented cam faces arranged to define said concentric rows in said cover, each of said cam faces including a ramp inclining radially outwardly in a direction towards said pressure plate at an angle in the range of 30° to 50°.

5. In a centrifugal clutch according to claim 4 wherein said pressure plate includes a plurality of indented cam faces aligned with said cam faces in said cover to define complementary pairs of said cam faces, each said complementary pair receiving one of said cam members therebetween.

6. In a centrifugal clutch according to claim 1 wherein said cam members are composed of tungsten carbide.

7. In a centrifugal clutch according to claim 1 wherein a thrust washer is mounted between said driven member and said driven unit, and a plurality of bearing members are mounted between said driven unit and said driven member.

8. In a centrifugal clutch according to claim 7 wherein said bearing members are in the form of needle bearings arranged in circumferentially spaced relation to one another between said driven unit and said drive member.

9. In a centrifugal clutch having a rotary member to be driven, a driven unit coupled to said rotary member, a rotatable housing in outer spaced concentric relation to said rotary member including a cover, clutch members mounted for relative axial displacement into and out of engagement with one another between said driven unit and said housing, and a pressure plate axially displaceable between said cover and an endmost of said clutch members, the improvement comprising:

circumferentially spaced, aligned first and second indented cam faces disposed in facing relation to one another between said cover and said pressure plate, said first and second indented cam faces arranged in a pair of concentric rows and a radially inner staggered concentric row; and circumferentially spaced cam members arranged between said first and second indented cam faces, said cam members in said inner staggered concentric row being smaller than said cam members in other of said concentric rows wherein said cam members are movable radially outwardly at a predetermined speed of rotation between complementary pairs of cam faces to force said pressure plate axially away from said cover and in a direction causing said clutch members to move into clutching engagement with one another.

10. In a centrifugal clutch according to claim 9 wherein said cam members are of spherical shape and are composed of tungsten carbide.

11. In a centrifugal clutch according to claim 10 wherein said first cam faces in said cover include ramps inclining toward said pressure plate.

12. In a centrifugal clutch according to claim 11 wherein each of said first cam faces is of generally oval-shaped configuration elongated in a radial direction along said cover.

13. In a centrifugal clutch according to claim 12 wherein said ramps in said inner concentric row which receives said smaller staggered cam members are shorter than said ramps in said other rows.

14. In a centrifugal clutch according to claim 9 wherein said cam members are composed of tungsten carbide.

15. In a centrifugal clutch according to claim 9 wherein said cam members have cylindrical surfaces movable along confronting surfaces of each said complementary pair of said cam faces.

16. In a centrifugal clutch according to claim 9 wherein said cam members have spherical surfaces movable along confronting surfaces of each said complementary pair of said cam faces.

17. In a centrifugal clutch according to claim 9 wherein spring means bias said pressure plate in an axial direction away from said clutch members.

* * * * *

UNITED STATES PATENT AND TRADEMARK OFFICE
CERTIFICATE OF CORRECTION

PATENT NO. : 6,814,208 B2
DATED : November 9, 2004
INVENTOR(S) : Drussel, D. W. et al.

It is certified that error appears in the above-identified patent and that said Letters Patent is hereby corrected as shown below:

Column 3,
Line 11, cancel "but" and substitute -- out --.

Column 6,
Lines 22, 24, 29, 33 and 48, cancel "3/8'" and substitute -- 3/8" --.
Lines 25, 28, 33 and 49, cancel "5/16'" and substitute -- 5/16" --.
Line 48, cancel "1/16'" and substitute -- 1/16" --.

Signed and Sealed this

Fourth Day of January, 2005

JON W. DUDAS
*Director of the United States Patent and Trademark Office*

(12) EX PARTE REEXAMINATION CERTIFICATE (7336th)
United States Patent
Drussel et al.

(10) Number: US 6,814,208 C1
(45) Certificate Issued: Jan. 26, 2010

(54) MULTI-ROW CAM-ACTUATED CENTRIFUGAL CLUTCH

(75) Inventors: Douglas W. Drussel, Sedalia, CO (US); George Michael Wilfley, Englewood, CO (US)

(73) Assignee: Drussel Wilfley Design, LLC, Denver, CO (US)

Reexamination Request:
No. 90/010,228, Jul. 28, 2008

Reexamination Certificate for:
Patent No.: 6,814,208
Issued: Nov. 9, 2004
Appl. No.: 10/327,160
Filed: Dec. 20, 2002

Certificate of Correction issued Jan. 4, 2005.

Related U.S. Application Data

(63) Continuation-in-part of application No. 09/877,518, filed on Jun. 7, 2001, now Pat. No. 6,705,446.

(51) Int. Cl.
*F16D 43/08* (2006.01)

(52) U.S. Cl. .............................. 192/105 B; 192/70.23; 192/89.1; 192/93 C

(58) Field of Classification Search .............. 192/105 B, 192/70.23, 89.1, 93 C
See application file for complete search history.

(56) References Cited

U.S. PATENT DOCUMENTS

| | | | |
|---|---|---|---|
| 2,368,299 A | 1/1945 | Hayter |
| 3,939,734 A | 2/1976 | Blanchette |
| 4,055,371 A | 10/1977 | Ernst |
| 4,550,817 A | 11/1985 | Euler |

OTHER PUBLICATIONS

Honda, Clutch CR125R '98–'99, Honda '98–'99 Parts Catalog, 1999, Honda, USA.

*Primary Examiner*—Matthew C. Graham

(57) ABSTRACT

A centrifugal clutch for motorcycles employs a cam-actuating mechanism having multiple rows of centrifugal force-responsive cam members of a selected density and size to force a series of clutch plates into clutching engagement over the shortest possible distance and least possible speed of rotation while assuring ease of positive engagement of the clutch members in response slight increases in speed of rotation. The cam-actuating mechanism can be employed with a manual override mechanism to manually control locking and release of the clutch members as well as utilizing a torque limiter to absorb shock loads without unduly increasing the size of the clutch so that it will readily fit into the space occupied by existing or standard clutch mechanisms.

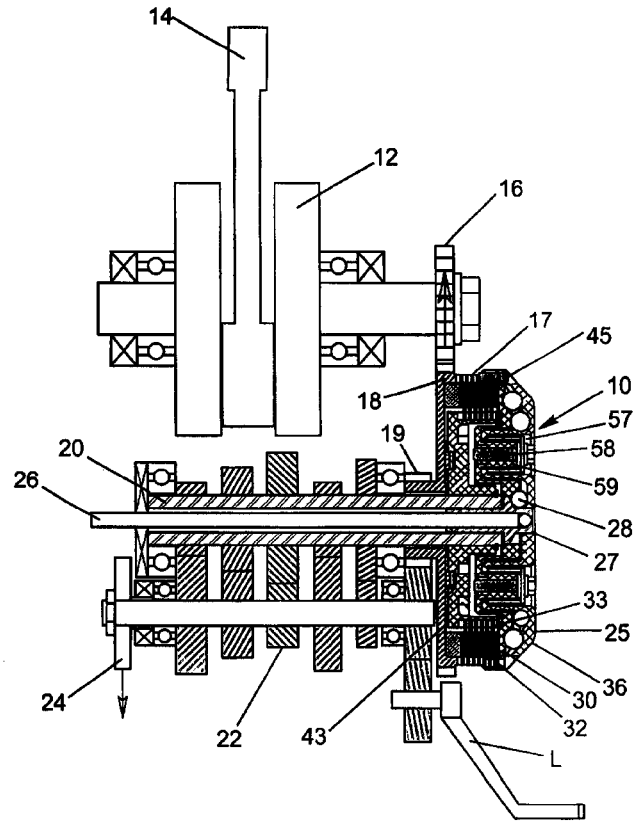

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–17 is confirmed.

New claims 18–21 are added and determined to be patentable.

18. *In a centrifugal clutch having a rotary driven member, a driven unit coupled to said driven member, a rotatable drive member in outer spaced concentric relation to said driven member, clutch members mounted for relative axial displacement into and out of engagement with one another between said driven unit and said drive member, and a pressure plate axially displaceable between a cover and an endmost of said clutch members, the improvement comprising:*
   *a plurality of cam members interposed between said cover and said pressure plate wherein said cam members are movable radially outwardly under centrifugal force to cause said pressure plate to move in a direction causing said clutch members to move into clutching engagement with one another; and*
   *cam retainer means between said pressure plate and said cover for retaining said cam members in a plurality of radially inner and outer concentric rows whereby to guide radial movement of said cam members, and wherein one of said rows is staggered with respect to the other of said rows.*

19. *In a centrifugal clutch according to claim 18 wherein said retainer means are defined by a plurality of indented cam faces in said cover being aligned with a plurality of indented cam faces in said pressure plate to define complementary pairs of said cam faces, each of said complementary pair receiving one of said cam members therebetween.*

20. *In a centrifugal clutch according to claim 19 wherein said cam members in one of said inner concentric rows are smaller than said cam members in another of said concentric rows.*

21. *In a centrifugal clutch having a rotary driven member, a driven unit coupled to said driven member, a rotatable drive member in outer spaced concentric relation to said driven member, clutch members mounted for relative axial displacement into and out of engagement with one another between said driven unit and said drive member, and a pressure plate axially displaceable between a cover and an endmost of said clutch members, the improvement comprising:*
   *a plurality of cam members interposed between said cover and said pressure plate wherein said cam members are movable radially outwardly under centrifugal force to cause said pressure plate to move in a direction causing said clutch members to move into clutching engagement with one another; and*
   *can retainer means between said pressure plate and said cover for retaining said cam members in a plurality of concentric rows whereby to guide radial movement of said cam members and wherein one of said rows is staggered with respect to the other of said rows and wherein said retainer means are defined by a plurality of indented cam faces defining said concentric rows in said cover and a plurality of indented cam faces arranged to define said concentric rows in said pressure plate and aligned with said cam faces in said cover to define complementary pairs of said cam faces, each of said complementary pairs receiving one of said cam members therebetween.*

\* \* \* \* \*